United States Patent Office

3,850,937
Patented Nov. 26, 1974

3,850,937
DERIVATIVES OF 6-(γ-DIALKYLAMINO) ALKOXY 4,7-DIMETHOXY BENZOFURAN
Claude P. Fauran, Paris, Jeannine A. Eberle, Chatou (Yvelines), Guy M. Raynaud, Paris, Bernard M. Pourrias, Meudon-la-Foret, and Guy B. Bourgery, Colombes, France, assignors to Delalande S.A., Courbevoie, Hauts-de-Seine, France
No Drawing. Filed July 25, 1972, Ser. No. 274,997
Claims priority, application France, July 26, 1971, 7127284; July 3, 1972, 7224020
Int. Cl. C07d 87/32
U.S. Cl. 260—293.58
7 Claims

ABSTRACT OF THE DISCLOSURE

Compound of the formula

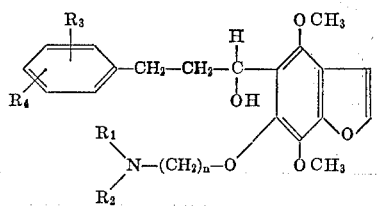

in which $R_1$ and $R_2$ are alkyl of 1 to 4 carbon atoms or

is pyrrolidino, piperidino, morpholino or perhydroazepino;
$R_3$ and $R_4$ are H, halogen, OH, alkoxy having 1 to 4 carbon atoms, or $R_3$ or $R_4$ together form methylenedioxy; and $n$ is 2 or 3.

The compounds are prepared by reducing the corresponding cinnamoyl compounds when $R_3$ and $R_4$ are not OH. When $R_3$ and/or $R_4$ are OH, the corresponding cinnamoyl compound is converted to the phenate and then reduced. The compounds possess vasodilatatory, hypotensive, diuretic, spasmolytic, sedative, analgesic, anti-inflammatory, anti-histaminic, anti-ulcerous, anti-angiotensive and anti-hypertensive properties.

---

The present invention relates to new derivatives of 6-(γ-dialkylamino) alkoxy 4,7-dimethoxy benzofuran, their method of preparation and their therapeutical application.

More particularly, the new compounds according to the present invention are 6-(γ-dialkylamino) alkoxy 4,7-dimethoxy 5-(1'-hydroxy 3'-phenyl 1'-propyl) benzofurans of the formula:

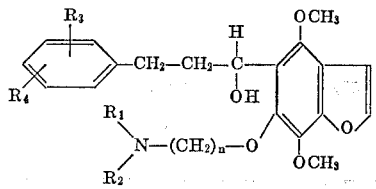

the group —N($R_1$,$R_2$) represents a dialkylamino group, an alkyl group containing from 1 to 4 carbon atoms or a heterocyclic ring system selected from amongst the following: pyrrolidino, piperidino, morpholino and perhydroazepino;

the radicals $R_3$ and $R_4$ each are one selected from the following substituents: a hydrogen atom, a halogen atom, a hydroxy group and an alkoxy group containing 1 to 4 carbon atoms, $R_3$ and $R_4$ possibly being identical or together forming a methylenedioxy bridge;

$n$ is 2 or 3.

When $R_3$ and/or $R_4$ represent a substituent other than a hydroxy group, the method of preparation according to the invention consists in reducing a compound of the formula:

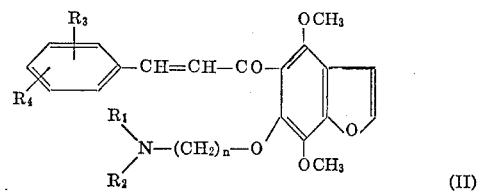

with sodium or potassium borohydride (4 moles) in the presence of pyridine (4 moles) in an alcoholic medium.

When $R_3$ and/or $R_4$ represent a hydroxy group, the compound of Formula II is firstly converted into a phenate in an ethanolic medium, the phenate thereafter being reduced in the manner described above. In either case, the compounds obtained can be converted into their salts with maleic, oxalic or fumaric acid.

The present invention also relates to therapeutical compositions comprising a compound of the formula I in association with a therapeutically acceptable carrier.

The invention will be further described, by way of example, with reference to the following non-limitative Examples which illustrate the method of preparation of the compounds.

EXAMPLE I 6-piperidinoethoxy 4,7-dimethoxy 5-(1'-hydroxy p-methoxy-phenyl-3'1'-propyl) benzofuran Reference No. 7146

To a solution of 5-(p-methoxy cinnamoyl)6-(β-piperidino) ethoxy 4,7-dimethoxy benzofuran (0.14 mole) in methanol or ethanol (100 ml.) also containing pyridine (0.56 mole) and several drops of concentrated sodium hydroxide, there is added, over a period of 15 minutes, at room temperature, a solution of sodium or potassium borohydride (0.56 mole) in methanol or ethanol (150 ml.), stabilised by 3 or 4 drops of concentrated sodium hydroxide. The temperature of the reaction medium rises by several degrees. The mixture is heated under reflux for 5 hours and the solvents then distilled off under reduced pressure. A semi-crystalline yellow compound is obtained which is extracted with ethyl acetate and washed with water until neutral. The compound is then dried. A yellow oil is obtained which is crystallised in hexane.

Melting point _____ 70° C.
Yield _____ 66%
Empirical Formula _____ $C_{27}H_{35}NO_6$ Elementary analysis

| | C | H | N |
|---|---|---|---|
| Calculated percent | 69.06 | 7.51 | 2.98 |
| Found percent | 69.09 | 7.31 | 3.12 |

EXAMPLE 2

6-(β-dimethylamino)ethoxy 4,7-dimethoxy 5-[1'-hydroxy 3'-(2''-hydroxy 3''-methoxy phenyl) 1'-propyl)]benzofuran Reference No. 71233

To a solution of 5-(2'-hydroxy 3'-methoxy cinnamoyl) 6-(β-dimethylamino) ethoxy 4,7-dimethoxy benzofuran (0.25 mole) in ethanol (100 ml.) also containing pyridine (1.25 mole) and concentrated sodium hydroxide (25 ml.), there is added, under nitrogen, over a period of 15 minutes a solution of sodium or potassium borohydride (1.25 mole) in ethanol (400 ml.) stabilised by 3 or 4 drops of concentrated sodium hydroxide.

The temperature of the reaction mixture rises by about ten degrees. The mixture is then heated under reflux for 7 hours. The solvents are removed, and the residue taken up in water (1 liter) and neutralised with concentrated hydrochloric acid. The product is precipitated, filtered and recrystallised from ethyl acetate.

Melting point _____ 154° C.
Yield _____ 71%
Empirical Formula _____ $C_{24}H_{31}NO_7$ Elementary analysis

|  | C | H | N |
|---|---|---|---|
| Calculated percent | 64.70 | 7.01 | 3.14 |
| Found percent | 64.90 | 7.04 | 3.30 |

The compounds shown in Table I below have been prepared according to the method given in detail in Example I with the exception of the compounds referenced 71251, 71293, 71247, 71262, 72165, 72179, 72157, 72212, 72218, 72248, 72178, 71544, 72169, 72170, 72249, 72199 and 72225, all of which prepared according to the method described in Example 2.

The compounds of formula (II) used as starting materials have been described in French Patent Application No. 6,921,213 (published under No. 2,014,524) filed in our name on 25th June 1969 and entitled: "New Derivatives of 5-Cinnamoyl Benzofuran, Their Method of Preparation and Their Utilisation in Therapeutics.

TABLE I

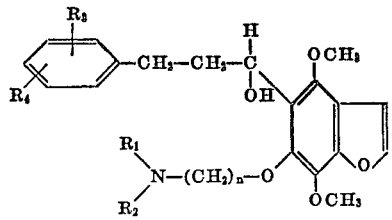

| Reference No. | $R_1$ $R_2$ N— | $R_3=R_4$ | n | Form | Yield, percent | Melting point, °C | Empirical formula | Molecular weight | Calculated C | Calculated H | Calculated N | Found C | Found H | Found N |
|---|---|---|---|---|---|---|---|---|---|---|---|---|---|---|
| 7178 | $CH_3$, $CH_3$ N— | H | 2 | Oxalate | 53 | 92 | $C_{25}H_{31}N\ O_9$ | 489.51 | 61.34 | 6.38 | 2.86 | 61.35 | 6.54 | 2.95 |
| 71246 | $C_2H_5$, $C_2H_5$ N— | H | 2 | Base | 40 | 62 | $C_{25}H_{33}N\ O_5$ | 427.52 | 70.23 | 7.78 | 3.28 | 70.09 | 7.74 | 3.17 |
| 70429 | pyrrolidinyl N— | H | 2 | Oxalate | 67 | 128 | $C_{27}H_{33}N\ O_9$ | 515.54 | 62.90 | 6.45 | 2.72 | 62.96 | 6.29 | 2.87 |
| 71210 | piperidinyl N— | H | 2 | do | 70 | 139 | $C_{28}H_{35}N\ O_9$ | 529.57 | 63.50 | 6.66 | 2.65 | 63.58 | 6.62 | 2.81 |
| 7185 | morpholinyl N— | H | 2 | do | 89 | 176 | $C_{27}H_{33}N\ O_{10}$ | 531.54 | 61.01 | 6.26 | 2.64 | 61.21 | 6.25 | 2.62 |
| 71252 | hexamethyleneimino N— | H | 2 | do | 62 | 138 | $C_{29}H_{37}N\ O_9$ | 543.59 | 64.07 | 6.86 | 2.58 | 64.21 | 6.89 | 2.57 |

| Reference No. | $R_1$ $R_2$ N— | $R_3$ | $R_4$ | n | Form | Yield, percent | Melting point, °C | Empirical formula | Molecular weight | Calculated C | Calculated H | Calculated N | Found C | Found H | Found N |
|---|---|---|---|---|---|---|---|---|---|---|---|---|---|---|---|
| 70383 | $CH_3$, $CH_3$ N— | H | 4-$CH_3O$— | 2 | Oxalate | 82 | 110 | $C_{26}H_{34}N\ O_{10}$ | 519.53 | 60.10 | 6.40 | 2.70 | 60.22 | 6.42 | 2.90 |
| 7112 | $C_2H_5$, $C_2H_5$ N— | H | 4-$CH_3O$— | 2 | Base | 60 | 52 | $C_{25}H_{35}N\ O_6$ | 457.55 | 68.25 | 7.71 | 3.06 | 68.07 | 7.65 | 3.19 |
| 71169 | iso $C_3H_7$, iso $C_3H_7$ N— | H | 4-$CH_3O$— | 2 | do | 23 | 70 | $C_{28}H_{39}N\ O_6$ | 485.60 | 69.25 | 8.10 | 2.88 | 69.45 | 8.02 | 3.07 |
| 7145 | pyrrolidinyl N— | H | 4-$CH_3O$— | 2 | do | 58 | 67 | $C_{26}H_{33}N\ O_6$ | 455.53 | 68.55 | 7.30 | 3.08 | 68.50 | 7.24 | 3.08 |
| 7184 | morpholinyl N— | H | 4-$CH_3O$— | 2 | Oxalate | 65 | 102 | $C_{28}H_{35}N\ O_{11}$ | 561.57 | 59.82 | 6.28 | 2.49 | 60.03 | 6.53 | 2.60 |
| 71292 | $CH_3$, $CH_3$ N— | H | 4-$CH_3O$— | 3 | Base | 15 | 70 | $C_{25}H_{33}N\ O_6$ | 443.52 | 67.70 | 7.50 | 3.15 | 67.50 | 7.30 | 3.31 |

TABLE I—Continued

| Reference No. | R₁\N\R₂ | R₃=R₄ | | n | Form | Yield, percent | Melting point, °C. | Empirical formula | Molecular weight | Calculated C | Calculated H | Calculated N | Found C | Found H | Found N |
|---|---|---|---|---|---|---|---|---|---|---|---|---|---|---|---|
| 7111 | CH₃\N—\CH₃ | H | 4-Cl— | 2 | Base | 55 | 60 | $C_{23}H_{28}ClNO_5$ | 433.92 | 63.66 | 6.50 | 3.23 | 63.63 | 6.60 | 3.40 |
| 70322 | CH₃\N—\CH₃ | 3-Cl | 4-Cl— | 2 | Maleate | 80 | 105 | $C_{27}H_{31}Cl_2NO_9$ | 584.44 | 55.48 | 5.35 | 2.40 | 55.40 | 5.41 | 2.60 |
| 7161 | CH₃\N—\CH₃ | H | 4-F | 2 | Oxalate | 80 | 148 | $C_{25}H_{30}FNO_9$ | 507.50 | 59.16 | 5.96 | 2.76 | 59.25 | 5.99 | 2.82 |
| 71251 | CH₃\N—\CH₃ | H | 4-HO— | 2 | Base | 53 | 125 | $C_{23}H_{29}NO_6$ | 415.74 | 66.49 | 7.04 | 3.37 | 66.32 | 7.15 | 3.53 |
| 71293 | C₂H₅\N—\C₂H₅ | H | 4-HO— | 2 | ...do... | 20 | 117 | $C_{25}H_{33}NO_6$ | 443.52 | 67.70 | 7.50 | 3.16 | 67.53 | 7.35 | 3.12 |
| 71247 | ⟨piperidino⟩ | H | 4-HO— | 2 | ...do... | 59 | 170 | $C_{26}H_{33}NO_6$ | 455.53 | 68.55 | 7.30 | 3.08 | 68.41 | 7.35 | 3.13 |
| 71317 | CH₃\N—\CH₃ | H | 4-C₂H₅O— | 2 | Base | 63 | 83 | $C_{25}H_{33}NO_6$ | 443.52 | 67.70 | 7.50 | 3.16 | 67.90 | 7.44 | 3.19 |
| 71217 | CH₃\N—\CH₃ | H | 4-isoC₃H₇O | 2 | Oxalate | 73 | 133 | $C_{25}H_{37}NO_{10}$ | 547.58 | 61.41 | 6.81 | 2.56 | 61.56 | 6.65 | 2.73 |
| 71256 | CH₃\N—\CH₃ | H | 4-nC₃H₇O— | 2 | ...do... | 81 | 119 | $C_{28}H_{37}NO_{10}$ | 547.58 | 61.41 | 6.81 | 2.56 | 61.34 | 6.66 | 2.71 |
| 71267 | CH₃\N—\CH₃ | H | 4-nC₄H₉O— | 2 | ...do... | 55 | 110 | $C_{29}H_{39}NO_{10}$ | 561-61 | 62.02 | 7.00 | 2.49 | 62.09 | 7.20 | 2.46 |
| 71194 | CH₃\N—\CH₃ | 2-OCH | H | 2 | Oxalate | 57 | 150 | $C_{26}H_{33}NO_{10}$ | 519.53 | 60.10 | 6.40 | 2.70 | 60.06 | 6.34 | 2.87 |
| 71199 | CH₃\N—\CH₃ | 3-OCH | H | 2 | Base | 39 | 59 | $C_{24}H_{31}NO_6$ | 429.49 | 67.11 | 7.51 | 3.26 | 66.93 | 7.26 | 3.27 |
| 71262 | CH₃\N—\CH₃ | 3-OH | 4-CH₃O— | 2 | ...do... | 25 | 104 | $C_{24}H_{31}NO_7$ | 445.49 | 64.70 | 7.01 | 3.14 | 64.91 | 6.91 | 3.26 |
| 71202 | CH₃\N—\CH₃ | 3,4-O-CH₂-O— | | 2 | Fumarate.* | 65 | 170 | $C_{30}H_{35}NO_{13}$ | 617.59 | 58.34 | 5.71 | 2.50 | 58.52 | 5.74 | 2.48 |

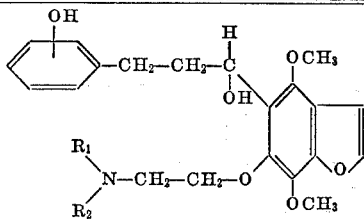

(I)

| Reference No. | —N\R₁\R₂ | Position of group OH | Yield (percent) | Melting point (°C.) | Empirical formula | Molecular weight | Calculated C | Calculated H | Calculated N | Found C | Found H | Found N |
|---|---|---|---|---|---|---|---|---|---|---|---|---|
| 72165 | CH₃\—N\CH₃ | Ortho | 64 | 181 | $C_{23}H_{29}NO_6$ | 415.47 | 66.49 | 7.04 | 3.37 | 66.38 | 7.24 | 3.53 |
| 72179 | CH₃\—N\CH₃ | Meta | 78 | 170 | $C_{23}H_{29}NO_6$ | 415.47 | 66.49 | 7.04 | 3.37 | 66.28 | 6.97 | 3.38 |

TABLE I—Continued

| Reference No. | $-N\begin{smallmatrix}R_1\\R_2\end{smallmatrix}$ | Position of group O H | Yield, percent | Melting point, °C. | Empirical formula | Molecular weight | Elementary analysis, percent |||||| 
|---|---|---|---|---|---|---|---|---|---|---|---|---|
| | | | | | | | Calculated ||| Found |||
| | | | | | | | C | H | N | C | H | N |
| 72157 | | Ortho | 70 | 150 | $C_{25}H_{31}NO_6$ | 441.51 | 68.01 | 7.08 | 3.17 | 68.02 | 7.12 | 3.22 |
| 72212 | —N⬡ | Meta | 70 | 138 | $C_{25}H_{31}NO_6$ | 441.51 | 68.01 | 7.08 | 3.17 | 68.20 | 7.16 | 3.07 |
| 72218 | | Para | 46 | 149 | $C_{25}H_{31}NO_6$ | 441.51 | 68.01 | 7.08 | 3.17 | 67.85 | 7.24 | 3.37 |
| 72248 | | Ortho | 74 | 131 | $C_{25}H_{31}NO_7$ | 457.51 | 65.63 | 6.83 | 3.06 | 65.59 | 6.84 | 3.20 |
| 72178 | —N⬡O | Meta | 90 | 159 | $C_{25}H_{31}NO_7$ | 457.51 | 65.63 | 6.83 | 3.06 | 65.81 | 6.90 | 3.21 |
| 71544 | | Para | 54 | 140 | $C_{25}H_{31}NO_7$ | 457.51 | 65.63 | 6.83 | 3.06 | 65.72 | 6.84 | 3.26 |
| 72169 | | Ortho | 65 | 166 | $C_{26}H_{33}NO_6$ | 455.53 | 68.55 | 7.30 | 3.08 | 68.67 | 7.46 | 3.23 |
| 72170 | —N⬡ | Meta | 78 | 148 | $C_{26}H_{33}NO_6$ | 455.53 | 68.55 | 7.30 | 3.08 | 68.54 | 7.50 | 3.08 |
| 72249 | | Ortho | 81 | 143 | $C_{27}H_{35}NO_6$ | 469.56 | 69.06 | 7.51 | 2.98 | 68.98 | 7.58 | 3.18 |
| 72199 | —N⬡ | Meta | 75 | 130 | $C_{27}H_{35}NO_6$ | 469.56 | 69.06 | 7.51 | 2.98 | 69.01 | 7.66 | 3.05 |
| 72225 | | Para | 40 | 153 | $C_{27}H_{35}NO_6$ | 469.56 | 69.06 | 7.51 | 2.98 | 68.90 | 7.64 | 3.11 |

*Plus ½ mole of fumaric acid.

The compounds of formula (I) have been studied on laboratory animals and have shown vasodilatatory, hypotensive, diuretic, spasmolytic, sedative, analgesic, anti-inflammatory, antihistaminic, anti-ulcerous, antiangiotensive and anti-hypertensive properties.

1. Vasodilatatory properties (a) The compounds of formula (I) are capable of increasing the flow of the coronary vessels of the isolated heart of a guinea pig when they are added to the perfusion liquid of this organ.

By way of example, the results obtained with different compounds of formula (I) are given in Table II.

TABLE II

| Reference No. of compound tested | Concentration introduced into the perfusion liquid (μg./ml.) | Percentage increase in the flow of the isolated heart of a guinea pig |
|---|---|---|
| 72170 | 0.25 | 135 |
| 72248 | 0.5 | 45 |
| 72225 | 0.5 | 80 |
| 71544 | 0.25 | 50 |
| 71256 | 0.25 | 30 |
| 71267 | 0.25 | 30 |

(b) Moreover the compounds of formula (I) are capable of relaxing the spasm in the isolated artery of a rabbit caused by depolarisation by potassium chloride.

By way of example, the doses of certain compounds which inhibit this effect by 100% are given in Table III.

TABLE III

| Reference No. of compound tested | DI 100 (μg.) |
|---|---|
| 72170 | 100 |
| 72165 | 100 |
| 72249 | 100 |
| 72218 | 30 |
| 72212 | 100 |
| 72199 | 100 |
| 72225 | 30 |
| 72157 | 100 |
| 72169 | 100 |

(c) Finally, administered intraarterially in doses which do not effect the arterial pressure, the compounds of formula (I) cause an increase in the flow of the femoral artery to the level at which the injection is effected in the anaesthetised dog with carotido-femoral anastomosis, the measurement being effected by means of a rotameter placed at the level of the derivation.

The results obtained with certain of these compounds are given in Table IV.

TABLE IV

| Reference No. of compound tested | Dose administered, μg./kg./1 | Increase in the femoral flow, percent |
|---|---|---|
| 70322 | 25 | 50 |
| 70383 | 50 | 55 |
| 70429 | 100 | 80 |
| 7111 | 100 | 50 |
| 1712 | 50 | 115 |
| 7161 | 100 | 90 |
| 7178 | 50 | 75 |
| 7184 | 50 | 75 |
| 7185 | 50 | 85 |
| 71169 | 50 | 100 |
| 71194 | 50 | 55 |
| 71199 | 50 | 60 |

2. Hypotensive properties

Administered intravenously into an anaesthetised rat or cat the compounds of formula (I) cause a lowering of the arterial pressure.

The results obtained with certain of these compounds are given in Table V.

TABLE V

| Reference No. of compound tested | Dose administered | Animal | Reduction in arterial pressure ||
|---|---|---|---|---|
| | | | Intensity, percent | Duration, min. |
| 70322 | 2 mg./kg./IV | cat | 50 | 10 |
| 71210 | 500 μg./kg./IV | rat | 50 | >50 |
| 71252 | 500 μg./kg./IV | rat | 55 | >30 |
| 71267 | 1 mg./kg./IV | rat | 60 | 40 |
| 71251 | 1 mg./kg./IV | rat | 25 | >30 |
| 71247 | 2 mg./kg./IV | rat | 45 | >45 |
| 71233 | 2 mg./kg./IV | rat | 50 | >30 |

3. Diuretic properties

The compounds of formula (I) administered orally, into either a mouse or a rat, simultaneously with an isotonic solution of sodium chloride (1) ml. per 25 g. body weight in the case of a mouse and 2.5 ml. per 100 g. body weight in the case of a rat) are capable of causing an increase in the volume of urine passed with respect to the reference level, this volume being measured during the four hours following administration.

The results obtained with certain of these compounds are given in Table VI.

TABLE VI

| Reference No. of compounds tested | Dose administered, mg./kg./PO | Animal | Increase in diuresis, percent |
|---|---|---|---|
| 70322 | 12.5 | Rat | 60 |
| 70383 | 12.5 | Rat | 200 |
| 70429 | 12.5 | Rat | 300 |
| 7111 | 25 | Rat | 70 |
| 7112 | 12.5 | Rat | 80 |
| 7145 | 12.5 | Rat | 100 |
| 7146 | 12.5 | Rat | 150 |
| 7161 | 12.5 | Rat | 150 |
| 7178 | 12.5 | Rat | 150 |
| 7184 | 25 | Rat | 100 |
| 7185 | 12.5 | Rat | 115 |
| 71169 | 12.5 | Rat | 70 |
| 71194 | 12.5 | Rat | 150 |
| 71199 | 12.5 | Rat | 180 |
| 71246 | 20 | Mouse | 70 |
| 71210 | 20 | do | 110 |
| 71252 | 20 | do | 65 |
| 71217 | 20 | do | 55 |
| 71233 | 20 | do | 55 |
| 72178 | 20 | do | 100 |
| 72170 | 20 | Rat | 100 |
| 72165 | 50 | Rat | 165 |
| 72249 | 50 | Rat | 150 |
| 72218 | 50 | Mouse | 100 |
| 72212 | 15 | do | 65 |
| 72199 | 12.5 | Rat | 70 |
| 72225 | 50 | Mouse | 100 |
| 72157 | 20 | do | 100 |
| 72179 | 50 | Rat | 150 |
| 72169 | 20 | Mouse | 100 |

4. Spasmolytic properties

The compounds of formula (I) introduced into the survival medium are capable of opposing the contractural action of barium chloride and acetylcholine on the isolated duodenum of a rat. This activity is estimated using papaverine and atropine as standards.

The results obtained with certain of these compounds are given in Table VII.

TABLE VII

| Reference No. of compounds tested | Spasmolytic activity x papaverine |
|---|---|
| 70322 | 4 |
| 70383 | 7 |
| 70429 | 8 |
| 7184 | 1.4 |
| 7185 | 1.2 |
| 71169 | 20 |
| 71199 | 4 |
| 71246 | 15 |
| 71252 | 20 |
| 71256 | 2 |
| 71217 | 4 |
| 71267 | 2 |
| 71247 | 14 |
| 72249 | 7 |
| 72248 | 3 |
| 72225 | 40 |
| 71544 | 3 |

5. Sedative properties

The compounds of formula (I) administered orally to a mouse reduces the number of explorations in the evasion enclosure.

By way of example, with a dose of 50 mg./kg/PO compound No. 71252 reduced the number of explorations by 60% and compound No. 71217 by 40%.

6. Analgesic properties

The compounds of formula (I) administered orally to a mouse are capable of reducing the number of painful stretchings caused by the interperitoneal injection of acetic acid.

The results obtained with certain of these compounds are given in Table VIII.

TABLE VIII

| Reference No. of compounds tested | Dose administered, mg./kg./PO | Reduction in the number of painful stretchings, percent |
|---|---|---|
| 71210 | 25 | 65 |
| 71252 | 50 | 70 |
| 71256 | 50 | 60 |
| 71267 | 50 | 60 |
| 71247 | 100 | 70 |
| 71262 | 100 | 55 |
| 72165 | 50 | 55 |
| 72249 | 30 | 50 |
| 72248 | 100 | 55 |
| 72199 | 15 | 50 |
| 72225 | 100 | 40 |
| 72157 | 50 | 70 |

7. Anti-inflammatory properties

These properties show themselves by a diminution of the local oedema caused by the sub-planar injection of a phlogogenic agent, such as carrageenin, in a rat followed by the oral administration of the compounds of formula (I).

By way of example, the administration of 50 mg./kg./PO of compound No. 72157 causes a percentage reduction in the sub-planar oedema equal to 50%, whilst with the same dose, compound No. 71256 reduces the oedema by 70%.

8. Antihistaminic properties

The compounds of formula (I) introduced into the survival medium are capable of opposing the contracturating effect of histamine on the isolated ileum of a guinea pig. This activity is determined taking promethazine as a standard.

By way of example, the antihistaminic activity of compound reference No. 71247 is equivalent to that of promethazine whilst that of compounds reference Nos. 72249 and 72225 are equivalent to 0.1 times that of promethazine.

9. Anti-Ulcerous properties

The compounds of formula (I), administered intraduodenally reduce the extent of gastric ulcers caused in a rat by tying of the pylorus. (Shay Ulcers).

By way of example, the results obtained by administration of different compounds of formula (I) are given in Table IX.

TABLE IX

| Reference No. of compounds tested | Dose administered, (mg./kg./ID) | Percentage reduction of the Shay ulcer, percent |
|---|---|---|
| 72178 | 50 | 65 |
| 72249 | 30 | 45 |
| 72212 | 15 | 65 |
| 72157 | 50 | 50 |
| 71544 | 50 | 60 |

10. Antiangiotensive properties

The compounds of formula (I) are capable of reducing the contractions of the isolated ileum of a guinea pig caused by angiotension. By way of example, the compounds reference Nos. 72170, 72225 and 72169 have a $DE_{50}$ equal to 0.7 µg./ml, 0.3 µg./ml. and 0.3 µg./ml. respectively.

11. Antihypertensive properties

The compounds of formula (I) administered orally into a hypertensive rat, are capable of lowering the systolic arterial pressure. By way of example, the administration of different compounds of Formula (I) gives the results shown in Table X.

TABLE X

| Reference No. of compounds tested | Dose administered (mg./kg./PO) | Percentage of rate in which the systolic arterial pressure is returned to normal. |
|---|---|---|
| 72218 | 50 | 80 |
| 72225 | 50 | 90 |
| 72169 | 25 | 65 |

As is shown by the comparison between the doses given hereinbefore and the results given in Table XI hereinafter the difference between the pharmacologically active doses and the lethal doses is sufficient to allow the utilisation of compounds of formula (I) in therapeutics.

TABLE XI

| Reference No. of compounds tested | Dose administered Given orally, mg./kg. | Given intraveinously, mg./kg. | Percentage mortality |
|---|---|---|---|
| 70322 | 210 | 42 | 50 |
| 70383 | 162 | 33 | 50 |
| 70429 | 130 | 9 | 50 |
| 7111 | 260 | 60 | 50 |
| 7112 | 190 | | 50 |
| 7145 | 195 | | 50 |
| 7146 | 175 | | 50 |
| 7161 | 155 | 21 | 50 |
| 7178 | 120 | 18 | 50 |
| 7184 | 390 | 82 | 50 |
| 7185 | 275 | 57 | 50 |
| 7169 | 148 | 13.5 | 50 |
| 71194 | 75 | 12 | 50 |
| 71199 | 150 | | 50 |
| 71246 | 275 | | 50 |
| 71210 | 350 | | 50 |
| 71252 | 400 | | 50 |
| 71256 | 575 | | 50 |
| 71217 | 600 | | 50 |
| 71267 | 600 | | 50 |
| 71251 | 650 | | 50 |
| 71247 | 1,000 | | 50 |
| 71233 | 2,000 | | 50 |
| 71262 | 900 | | 50 |
| 72178 | 2,000 | | 0 |
| 72170 | 550 | | 50 |
| 72165 | 560 | | 50 |
| 72249 | 280 | | 50 |
| 72248 | 2,000 | | 0 |
| 72218 | 300 | | 50 |
| 72212 | 130 | | 50 |
| 72199 | 160 | | 50 |
| 72225 | 450 | | 50 |
| 72157 | 475 | | 50 |
| 71544 | 2,000 | | 50 |
| 72179 | 1,600 | | 50 |
| 72169 | 350 | | 50 |

The compounds of formula (I) are suitable for use in the treatment of circulatory disorders, hypertensions, oedemas, spasms of various types, excitement and pains, in particular, inflammations, those of allergies and gastroduodenal ulcers.

They are administered orally in the form of tablets, sugar coated pills or containing 20 to 250 mg. of active constituent (1 to 5 per day) and in the form of drops dosed at 0.1 to 2% (20 drops, three times a day), rectally in the form of suppositories containing 20 to 150 mg. of active constituent (1 to 2 per day) and parenterally in the form of injectable ampoules containing 10 to 150 mg. of active constituent (1 to 2 per day).

What we claim is:

1. A compound of the formula

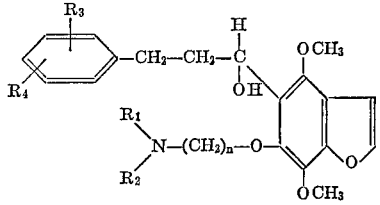

wherein

is pyrrolidino, piperidino, morpholino or perhydroazepino;

$R_3$ and $R_4$ each is H, halogen, OH or alkoxy having 1 to 4 carbon atoms, $R_3$ and $R_4$ being the same or different, or $R_3$ together with $R_4$ being methylenedioxy; and $n$ is 2 or 3 and the pharmaceutically acceptable acid addition salts thereof.

2. A compound as claimed in claim 1 wherein at least one of $R_3$ and $R_4$ is methoxy, ethoxy, isopropyloxy or n-butoxy.

3. A compound as claimed in claim 1 wherein at least one of $R_3$ and $R_4$ is chlorine or fluorine.

4. A compound as claimed in claim 1 wherein at least one of $R_3$ and $R_4$ is hydroxy.

5. A compound as claimed in claim 1 wherein one of $R_3$ and $R_4$ is hydroxy and the other is hydrogen.

6. A compound as claimed in claim 1, in which

is piperidino, $R_3$ is H, $R_4$ is p-hydroxyl and $n$ is 2.

7. A compound as in claim 1, in which $R_3$ and $R_4$ each is H, halogen, OH or alkoxy having 1 to 4 carbon atoms.

References Cited
UNITED STATES PATENTS 3,555,047   1/1971   Irmscher et al. ____ 260—345.5

G. THOMAS TODD, Primary Examiner

U.S. Cl. X.R.

260—247.7 G, 326.5 D, 346.2 R; 424—248, 267, 274, 285